United States Patent
Foo et al.

(10) Patent No.: US 6,433,681 B1
(45) Date of Patent: Aug. 13, 2002

(54) APPARATUS AND METHOD FOR DETECTING VEHICLE ROLLOVER HAVING ROLL-RATE SWITCHED THRESHOLD

(75) Inventors: Chek-Peng Foo, Ann Arbor; Huahn-Fern Yeh; Shun-Hsin Chang, both of Novi, all of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/769,039

(22) Filed: Jan. 24, 2001

Related U.S. Application Data

(63) Continuation-in-part of application No. 09/742,566, filed on Dec. 20, 2000.

(51) Int. Cl.⁷ .............................................. G06F 15/00
(52) U.S. Cl. ..................... 340/440; 340/436; 340/438; 340/665; 340/666; 180/282; 180/290; 701/45
(58) Field of Search .......................... 340/440, 429, 340/436, 689, 461, 438, 665, 666; 280/772, 730.02, 736, 775, 5.5; 364/424.055; 180/282, 271, 290; 701/45, 1; 200/61.45 R, 61.52

(56) References Cited

U.S. PATENT DOCUMENTS

| | | | |
|---|---|---|---|
| 5,391,845 A | 2/1995 | Haas et al. ........... 200/61.45 R |
| 5,553,924 A | 9/1996 | Cantor et al. .......... 297/452.27 |
| 5,610,575 A | 3/1997 | Gioutsos ..................... 340/429 |
| 5,825,284 A * | 10/1998 | Dunwoody et al. ......... 340/440 |
| 5,835,873 A | 11/1998 | Darby et al. .................. 701/45 |
| 5,890,084 A | 3/1999 | Halasz et al. ................. 701/45 |
| 6,055,472 A * | 4/2000 | Breunig et al. ............... 701/45 |
| 6,157,295 A * | 12/2000 | Steiner et al. ............... 340/440 |
| 6,170,594 B1 * | 1/2001 | Gilbert ....................... 180/282 |
| 6,192,305 B1 * | 2/2001 | Schiffmann .................. 701/45 |
| 6,321,141 B1 * | 11/2001 | Leimbach ...................... 701/1 |

OTHER PUBLICATIONS

An article by BEI Systron Donner Inertial Division entitled "GyroChip™ Industrial 'Solid–State' Rotation Sensor," dated Feb. 21, 1994.

* cited by examiner

*Primary Examiner*—Daniel J. Wu
*Assistant Examiner*—Davetta W. Goins
(74) *Attorney, Agent, or Firm*—Tarolli, Sundheim, Covell, Tummino & Szabo L.L.P.

(57) ABSTRACT

A vehicle rollover event detector (10) includes an accelerometer (80) that senses vehicle acceleration in a direction offset from a front-to-rear axis of the vehicle (12) and provides an acceleration signal (101) indicative thereof. A rollover sensor (14) senses vehicle roll and provides a roll signal (32) indicative of vehicle roll about the front-to-rear axis of the vehicle. A controller (26) compares the roll signal (32) against a first rollover threshold (42) when the acceleration signal (101) is less than an acceleration threshold (113) and compares the roll signal (32) against a second rollover threshold (116) when the acceleration signal (101) is equal to or greater than the acceleration threshold (113) and for indicating a vehicle rollover condition when the roll signal is greater than the threshold (42, 116) it is compared against.

15 Claims, 4 Drawing Sheets

APPARATUS AND METHOD FOR DETECTING VEHICLE ROLLOVER HAVING ROLL-RATE SWITCHED THRESHOLD

CROSS-REFERENCE TO RELATED APPLICATION

This application is a continuation-in-part of U.S. patent application Ser. No. 09/742,566, filed Dec. 20, 2000 in the name of Yeh et al. entitled "SYSTEM AND METHOD FOR SENSING VEHICLE ROLLOVER."

TECHNICAL FIELD

The present invention relates to an occupant protection system and, more particularly, to an apparatus and method for detecting a vehicle rollover event for use with an actuatable occupant rollover protection device.

BACKGROUND OF THE INVENTION

To detect a vehicle rollover event, a vehicle may be equipped with one or more sensors that detect vehicle dynamics. The sensors are connected to a controller that evaluates the sensor signals and controls actuation of one or more actuatable devices in response to a determined occurrence of a vehicle rollover event.

U.S. Pat. No. 5,825,284 discloses a vehicle rollover system having an acceleration sensor that provides a signal indicative of lateral acceleration of the vehicle. A processor calculates a roll-moment based on the sensor signal and provides a visual display indicating the likelihood of vehicle rollover.

U.S. Pat. No. 5,610,575 and U.S. Pat. No. 5,890,084 disclose other approaches to rollover detection.

SUMMARY OF THE INVENTION

In accordance with the present invention, a rollover sensor monitors vehicle roll and an accelerometer monitors lateral vehicle acceleration. The signal from the rollover sensor is compared against one of two thresholds in response to the sensed lateral acceleration. An occupant protection device is actuated in response to the rollover sensor comparison.

In accordance with one aspect of the present invention, an apparatus detects a vehicle rollover event. The apparatus includes a rollover sensor for sensing vehicle roll and providing a signal indicative of vehicle roll about a front-to-rear axis of the vehicle. An accelerometer senses vehicle acceleration in a direction offset from the front-to-rear axis of the vehicle and provides an acceleration signal indicative thereof. The apparatus further includes a controller for comparing the signal from the rollover sensor against a first rollover threshold when the acceleration signal is less than an acceleration threshold and for comparing the signal from the rollover sensor against a second rollover threshold when the acceleration signal is equal to or greater than the acceleration threshold. The controller indicates a vehicle rollover condition when the signal from the rollover sensor is greater than the threshold it is compared against.

In accordance with another aspect of the present invention, a method detects a vehicle rollover event comprising the steps of sensing vehicle roll and providing a roll signal indicative of vehicle roll about a front-to-rear axis of the vehicle, sensing vehicle acceleration in a direction offset from the front-to-rear axis of the vehicle and providing an acceleration signal indicative thereof, comparing the roll signal against a first rollover threshold when the acceleration signal is less than an acceleration threshold and for comparing the roll signal against a second rollover threshold when the acceleration signal is equal to or greater than the acceleration threshold and for indicating a vehicle rollover condition when the roll signal is greater than the threshold it is compared against.

BRIEF DESCRIPTION OF THE DRAWINGS

The invention will be understood by one skilled in the art upon consideration of the following description of an exemplary embodiment of the invention and the accompanying drawings, in which.

DESCRIPTION OF THE EXEMPLARY EMBODIMENT

Figure 1:
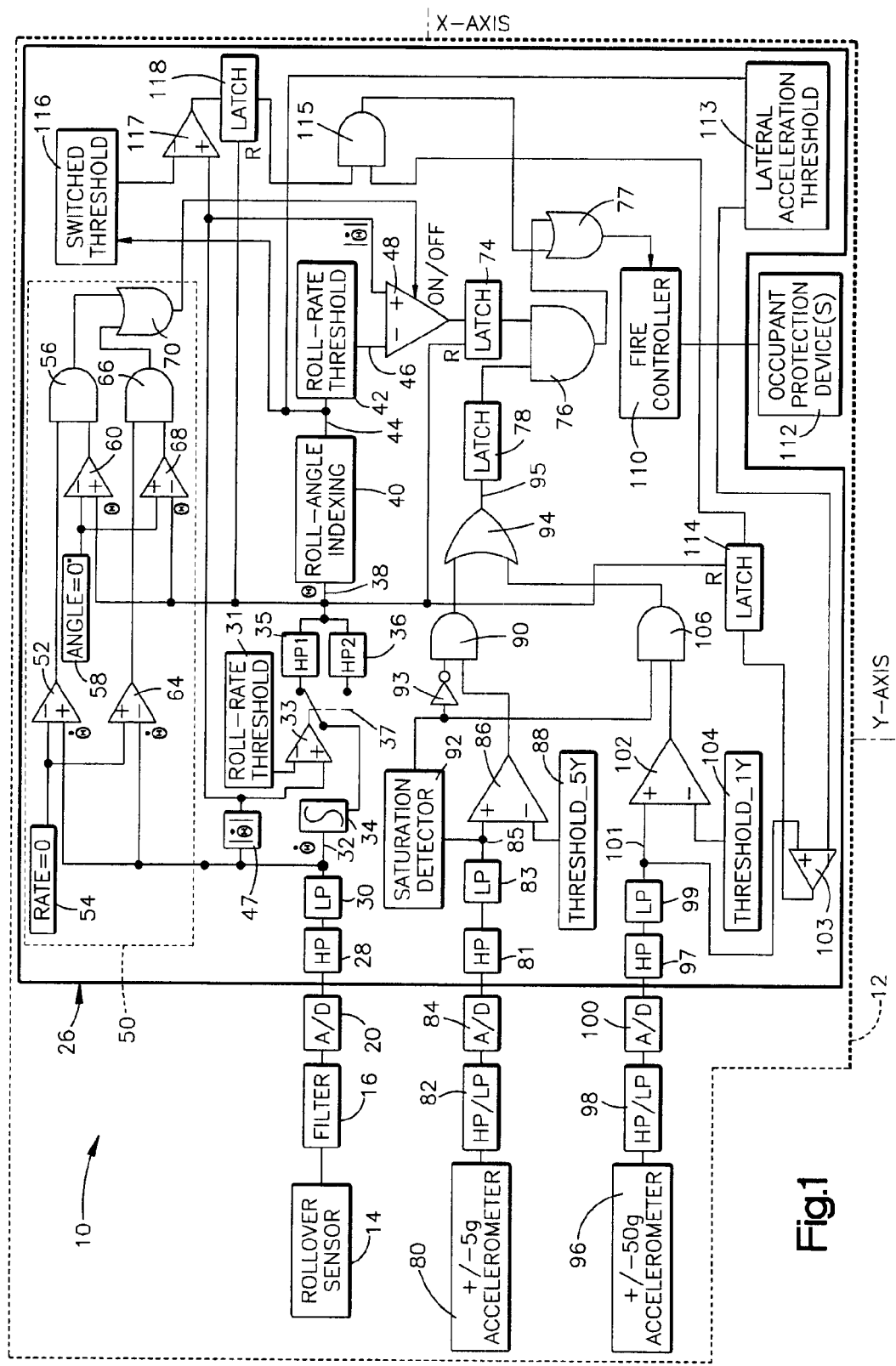
FIG. 1 is a schematic block diagram of an occupant rollover protection system in accordance with the present invention.

FIG. 1 illustrates an exemplary embodiment of an occupant rollover protection system 10 in accordance with the present invention. The system 10 is mountable in a vehicle 12. The system 10 includes a rollover discrimination sensor 14. The sensor 14 senses one or more vehicle operating characteristics or conditions that might indicate the occurrence of a vehicle rollover event. The sensor 14 provides a signal based on the sensed vehicle operating characteristic(s).

By way of example, the vehicle rollover discrimination sensor 14 is a roll-rate sensor operative to sense angular rotation of the vehicle 12 about an axis of the vehicle. The roll-rate sensor 14 may be mounted at or near a central vehicle location in the vehicle 12 and oriented so as to sense a rate of vehicle rotation about a longitudinal axis of the vehicle (e.g., an X-axis oriented parallel to or co-axial with the front-to-rear axis of the vehicle).

More particularly, the sensor 14 could be a microminiature structure configured to sense angular velocity (e.g., roll-rate) of the vehicle and fabricated using semiconductor manufacturing techniques. An example of such a sensor is the GYROCHIP™ industrial solid state rotation sensor, which is commercially available from BEI Sensors and Systems Co. of Concord, Calif. The GYROCHIP™ sensor uses the Coriolis Effect to produce an output signal having a DC voltage proportional to the rate of rotation about an axis of sensitivity of the sensor. Accordingly, when sensing a rate of angular rotation in a first direction about its axis of sensitivity, the DC output voltage from the sensor 14 is positive. Similarly, an angular rate of rotation in the other direction about the sensor axis of sensitivity provides a negative sensor output voltage. Thus, when mounted in the vehicle, the output signal of sensor 14 indicates angular velocity of the vehicle, including magnitude and angular direction, about the sensor axis of sensitivity. The axis of sensitivity of the sensor 14 is coaxial with the front-to-rear axis of the vehicle 12 through the center of the vehicle. Those skilled in the art will appreciate that the angular velocity about the vehicle's front-to-rear axis is the same as its roll-rate or rate of rotation.

Referring again to FIG. 1, the sensor 14 outputs a signal to a filter 16. The output signal of sensor 14 has an electrical characteristic indicative of the sensed rate of rotation or roll-rate of the vehicle 12. The filter 16 is selected so as to remove frequency components from the roll-rate signal that are not useful in discriminating a vehicle rollover event. These frequency values are determined using empirical methods for a vehicle platform of interest by placing the vehicle under various operating conditions. These frequency values may be unique for each vehicle platform.

The filter 16 provides a filtered roll-rate signal to an appropriate analog-to-digital ("A/D") converter 20. The A/D converter provides a digitized, filtered signal to a controller 26. The A/D converter 20 is illustrated as being external to the controller 26, although it, alternatively, could be an integral part of the controller, i.e., an A/D input of controller 26.

The elements shown in the controller block 26 correspond with functions and operations performed internally by the controller. The controller 26, for example, is a microcomputer programmed to perform the illustrated operations or functions in accordance with the present invention. Such functions alternatively could be performed with discrete circuitry, analog circuitry, a combination of analog and discrete components, and/or an application specific integrated circuit.

Additional digital filtering of the roll-rate signal preferably occurs within the controller 26. In particular, A/D converter 20 provides the digitized signal to a digital high-pass ("HP") filter function 28. The HP filter function 28 is used to eliminate DC drift that may result from the A/D conversion. She HP filter function 28 provides a high-passed filtered signal to a low-pass ("LP") filter function 30. The LP filter function 30 smoothes the roll-rate signal by removing noise and other high frequency components that are not useful in discriminating a vehicle rollover event. The LP filter function 30 provides a smoothed signal 32 to an integrator function 34 having a value indicative of vehicle roll-rate (i.e., angular velocity "d$\theta$/dt") about the front-to-rear axis of the vehicle. The integrator function 34, in turn, integrates the roll-rate signal 32 and provides a value indicative of a relative roll-angle of the vehicle 12 that is determined based on the determined roll-rate value, i.e., the roll-rate signal d$\theta$/dt at 32.

The output of the integrator function 34 is connectable to a selected one of two digital high-pass filters 35 and 36 through a switch 37. The switch 37 is controlled by the output of a comparator function 33. The roll-rate signal d$\theta$/dt at 32 is connected to an absolute value function 47 that determines the absolute value of the signal d$\theta$/dt. The absolute value |d$\theta$/dt| is connected to one input of comparator 33. The other input of the comparator 33 is connected to a roll-rate threshold value 31. The comparator 33 compares the absolute value of the roll-rate d$\theta$/dt against a predetermined roll-rate threshold 31. If the absolute value of the roll-rate is less than or equal to the threshold 31, the switch 37 connects the output of the integrator 34 to HP filter 35. If the roll-rate is greater than the threshold 31, the output of the integrator 34 is connected to HP filter 36.

The filtered integrated value of the roll-rate results in a signal having a value $\theta$ indicative of a normalized roll-angle of the vehicle 12 that is functionally related to the roll-rate value 32. Specifically, the roll-angle value $\theta$ at 38 indicates a relative amount of angular rotation of the vehicle determined from the sensed roll-rate. The roll-angle value $\theta$ at 38 is reset based on a time constant of the filters 35 and 36 so that the roll-angle value $\theta$ at 38 provides an indication of roll-angle of the vehicle during a time period of roll-rate. HP filter 35 has a smaller time constant than that of HP filter 36. If the integrated roll-rate value (roll angle) is connected to HP filter 31, it will decay back to zero faster than if it were connected to HP filter 36. The time constants used for HP filters 35 and 36 are dependent on the particular vehicle platform and the desired control for particular vehicle events. The time constant values can be based on empirical data or calculated data.

The roll-angle value $\theta$ at 38 output from either filter 35 or 36 typically will not indicate the actual roll-angle orientation of the vehicle 12 relative to the ground. In this way, the determination of a vehicle rollover event does not require a determination of an initial angular orientation of the vehicle relative to the ground or road. The rollover determination also does not require calculating an absolute angle of rotation of the vehicle relative to the ground.

The roll-angle value $\theta$ at 38 from one of the high-pass filter functions 35 or 36 is provided to a roll-angle indexing function 40. The roll-angle indexing function 40 provides an indexed output to an index roll-rate threshold determining function 42. The indexing function 40 divides the determined roll-angle value $\theta$ into discrete roll-angle index values 44 that are provided to the roll-rate threshold function 42. The roll-rate threshold function 42, for example, is implemented as a look-up table that stores predetermined threshold values responsive to the roll-rate index values 44. The indexing provides discrete output values in response to the roll-angle values $\theta$ at 38. These discrete output values are used to address locations in the look-up table of the roll-rate threshold function. The variable roll-rate threshold function 42 provides a roll-rate threshold 46 having a value functionally related to the index value 44 provided by the indexing function 40. Alternatively, the threshold value 46 could be calculated based on the roll-angle index value using predetermined functional relationships, i.e., functional equations. This indexing arrangement provides stepped threshold values. It is also contemplated that the roll-rate threshold value could be a continuously varying value that is functionally related to the roll-angle value $\theta$ at 38. The roll-rate threshold determining function 42 provides the threshold value 46 to a first input of a comparator function 48.

The absolute value of the roll-rate value at 32 from the absolute function 47 is provided to a second input of the comparator function 48. The comparator function 48 provides an output signal based on a comparison of the absolute value of the filtered roll-rate value 32 and the indexed roll-rate threshold value 46 when the comparator is enabled. Specifically, the comparator function 48 provides an output signal having a logic level (e.g., TRUE or FALSE, HIGH or LOW) that indicates whether the absolute value of the filtered roll-rate value from low-pass filter function 30 has a predetermined relationship relative to the indexed roll-rate threshold 46. In response to the absolute value of the roll-rate value crossing or exceeding the indexed threshold value 46 (i.e., if the absolute value of the roll-rate value is greater than the indexed threshold), a TRUE or HIGH is output from comparator 48 when the comparator is enabled.

Because a vehicle rollover event will occur only when both the roll-rate (Y-axis) and the roll-angle (X-axis) have the same algebraic sign, the exemplary embodiment of the system 10 includes a quadrant detection function 50. The quadrant detection function 50, for example, determines whether the roll-rate and roll-angle values are both in quadrant I (roll-rate and roll-angle are both in one direction referred to as the positive direction and both have positive values) or are both in quadrant III (roll-rate and roll-angle are both in a negative direction and both have negative values). Quadrants II and IV correspond to situations when the vehicle 12 is returning to a level, i.e., returning to a horizontal angular orientation relative to the ground.

Accordingly, for the purpose of determining whether a rollover event is occurring, it is desirable to perform the comparison function 48 only when the roll-rate signal and the indexed roll-angle have values that define a point that lies in quadrants I or III (e.g., when both the roll-rate and roll-angle have the same algebraic sign). A possible occurrence of vehicle rollover event can occur when, for example, (i) the roll-angle value $\theta$ at 38 is greater than or equal to 0° and the roll-rate value $d\theta/dt$ at 32 is greater than or equal to 0 or (ii) the roll-angle value $\theta$ at 38 is less than or equal to 0° and the roll-rate value $d\theta/dt$ 32 is less than or equal to 0.

In the exemplary embodiment of the present invention shown in FIG. 1, the quadrant detection function 50 includes a comparator function 52 having a first input that receives the determined roll-rate value $d\theta/dt$ at 32. A roll-rate reference value 54 (e.g., a value indicative of a roll-rate of 0°/second) is provided to a second input of the comparator function 52. The comparator 52 determines whether the sensed roll-rate value $d\theta/dt$ is greater than or equal to the reference value 54 and provides this comparison result to an input of an AND function 56.

A roll-angle reference value 58 (e.g., a value indicative of a roll-angle of 0°) is provided to a first input of a comparator function 60. The determined relative roll-angle value $\theta$ is provided to a second input of the comparator function 60. The comparator 60 determines if the roll-angle value $\theta$ is greater than the reference value 58. The comparator 60 provides a logic output value to another input of the AND function 56 based on the comparison of the determined roll-angle value $\theta$ and the reference value 58. The AND function 56 provides a logic output signal (e.g., TRUE or FALSE, HIGH or LOW) in response to the signals from the comparators 52 and 60 indicating whether both the roll-rate and roll-angle define a point lying in quadrant I. Quadrant I includes the lines defined by the angle equal to zero and the rate equal to zero.

Similar logic is used to determine whether the roll-rate and roll-angle define a point lying in quadrant III. For example, the roll-rate value $d\theta/dt$ is provided to a first input of a comparator function 64. The roll-rate reference value 54 is provided to a second input of the comparator 64. The comparator 64 determines whether the roll-rate value $d\theta/dt$ is less than or equal to the reference value (i.e., the roll-rate is negative). The comparator function 64 provides a corresponding logic output signal to an input of an AND function 66, e.g., a TRUE when the roll-rate $d\theta/dt$ is less than the reference rate 54.

The roll-angle reference value 58 is provided to a first input of comparator function 68. The determined roll-angle value $\theta$ is provided to a second input of the comparator function 68, which, in turn, provides a corresponding logic output signal to another input of the AND function 66, e.g., a TRUE when the roll-angle $\theta$ is less than the angle reference 58. The AND function 66 provides a logic output signal (e.g., TRUE or FALSE) in response to the signals from the comparators 64 and 68 indicating whether the roll-rate $d\theta/dt$ and roll-angle $\theta$ define a point in quadrant III. Similar to quadrant I, quadrant III includes the lines defined the angle equal to zero and the rate equal to zero. The actual point (0, 0) can be considered as in quadrant I.

Assuming, for purposes of explanation, that the roll-rate value $d\theta/dt$ has a positive value and the roll-angle value $\theta$ also is positive value, then each of the comparators 52, 60 outputs a TRUE or HIGH condition to the AND function 56. The AND function 56, in turn, provides a logic TRUE output signal, which indicates that the roll-rate value and the roll-angle value define a point lying in quadrant I. The other part of the quadrant determination algorithm 50 (e.g., 64, 66, 68) performs a similar quadrant determination with AND function 66 providing a TRUE when the roll-rate value $d\theta/dt$ and the roll-angle value $\theta$ define a point lying in quadrant III.

Each of the AND functions 56 and 66 provides a respective logic output signal to an associated input of an OR function 70. The OR function 70 controls operation, i.e., enablement, of the comparator function 48. Specifically, the OR function 70 provides a control signal (e.g., TRUE or FALSE) to the comparator function 48 for controlling operation of the comparator in response to the output values from the AND functions 56 and 66. For example, when the AND function 56 provides a TRUE condition to the OR function 70 (e.g., roll-rate and roll-angle are in quadrant I), the OR function 70 provides a digital TRUE or ON or ENABLE output signal to a control input of the comparator function 48. This enables operation of the comparator function 48 to check the absolute value of the roll-rate value against the indexed roll-rate threshold value 46. The comparator function 48 also is enabled when the AND function 66 provides a digital TRUE condition to the OR function 70. The comparison function 48 is enabled only when the roll-rate and roll-angle determinations are in quadrants I and III.

In a microcomputer embodiment of the system 10, the quadrant detection algorithm 50 and control of the comparator function would be implemented as a software program stored in an appropriate internal memory. The control logic, for example, might be implemented using well known programming techniques and programming languages.

The rollover comparator function 48 of the controller 26, in accordance with the exemplary embodiment of FIG. 1, is operative or enabled to check the absolute value of the roll-rate against the roll-rate threshold only, when the roll-rate and roll-angle have values that define a point in quadrant I or in quadrant III. This helps prevent against an erroneous determination of a vehicle rollover event if the roll-rate and roll-angle values are in quadrant II or IV. The roll-rate thresholds are empirically determined for a particular vehicle platform of interest in response to a plurality of different vehicle maneuvers that result in a rollover event.

Because vehicle rollover characteristics typically are the same regardless of the angular direction of rollover, a single set of roll-rate threshold values may be used for rollover discrimination in both quadrants I and III. In this example, the angle indexing function 40 provides the indexed roll-angle value to the roll-rate threshold function 42. The role rate threshold function 42 outputs its indexed threshold value 46 to the comparator 48. The comparator function 48, in turn, compares the absolute value of the magnitude of the roll-rate value $d\theta/dt$ against the corresponding indexed threshold value 46. A quadrant determination algorithm, such as 50 of FIG. 1, controls the comparator function 48 so that the roll-rate value is compared against the indexed threshold only when the roll-rate value and roll-angle value define a point that lies in quadrant I or III. Alternatively, separate positive and negative threshold values may be used for roll-rate comparisons in quadrants I and III.

The output of the comparator function 48 is provided to a latch function 74. When the comparator output provides a logic TRUE signal (e.g., a digital HIGH), the latch function 74 outputs a latched TRUE signal to an input of an AND function 76. Once it receives and latches the logic TRUE signal, it maintains a TRUE output until the roll angle θ becomes less than a positive reset value if the roll-rate and roll-angle is positive (i.e., the vehicle roll is in the positive direction) or greater than a negative reset value if the roll-rate and roll-angle is negative (i.e., the vehicle roll is in the negative direction).

A timing latch function 78 has an output that is used to provide a latched logic signal to another input of the AND function 76. A TRUE (or digital HIGH) signal from the latch function 78 represents an occurrence of a rollover event as indicated by safing sensors discussed below. A latched TRUE condition from latch function 78 provides TRUE signal to AND function 76 for as long as the rollover event is determined from the safing sensors or for a predetermined time period, such as about one second, and then reset to a LOW output.

In accordance with one exemplary embodiment, a first safing sensor includes an acceleration sensing device, such as an accelerometer 80. The accelerometer 80 is mounted to vehicle 12 with the sensor's axis of sensitivity oriented so as to sense lateral acceleration of the vehicle 12 (e.g., side-to-side acceleration in a direction parallel to the Y-axis of the vehicle). Generally, the axis of sensitivity of the accelerometer 80 is offset from the front-to-rear axis of the vehicle 12 and preferably, transverse to the front-to-rear axis of the vehicle.

In this exemplary embodiment, the accelerometer 80 has the ability of measuring acceleration up to a maximum level of acceleration. In this exemplary embodiment, the accelerometer 80 is a bi-directional ±5 g accelerometer (g being the value of acceleration due to earth's gravity, i.e., 32 feet/sec$^2$ or 9.8 meters/sec.$^2$). The accelerometer 80 outputs about 400 mV/g over its operative sensing range of ±5 g. Consequently, the accelerometer 80 is particularly useful in sensing vehicle dynamics associated with slow developing, low g, roll events, such as a non-impact induced vehicle rollover event. The accelerometer 80 provides a signal having an electrical characteristic indicative of the sensed lateral acceleration of the vehicle 12. The signal from the accelerometer 80 is provided to a filter network 82 formed of an appropriate combination of high-pass and low-pass filters. Additional filtering also may occur within the controller 26, such as through digital filtering techniques.

The filter network 82 provides a filtered lateral acceleration signal to an appropriate A/D converter 84. The A/D converter 84 could be internal to or external from the controller 26. The A/D converter 84, in turn, provides the digitized signal 85 to an input port of a HP digital filter 81 of controller 26. The HP filter 81 eliminates and DC drift resulting from the A/D conversion. The output of the HP filter 81 is connected to a digital LP filter 83 of controller 26 to further remove high frequencies that are not useful in determining the occurrence of a rollover event. The output 85 of the LP filter 83 is a digitized signal. The absolute value of the signal from LP filter 83 is applied to an input of a comparator function 86. A lateral acceleration threshold function 88 provides a threshold ("THRESHOLD_5Y") to a second input of the comparator function 86. The acceleration threshold 88 is selected to have a value substantially less than the maximum output voltage rating of the accelerometer 80 when subjected to an acceleration of 5 g's or greater. For example, the value for THRESHOLD_5Y could be voltage value equal to approximately ten percent of the maximum expected output voltage. The comparator function 86, in turn, provides a logic signal (e.g., TRUE or FALSE) to a first input of an AND function 90 indicating whether the digitized lateral acceleration signal 85 exceeds the lateral acceleration threshold 88.

The absolute value of the digitized acceleration signal 85 is also provided to an input of a saturation detector function 92. The saturation detector function 92 determines whether the digitized acceleration signal is saturated, i.e., substantially at its maximum value as would occur if the accelerometer is subjected to an acceleration of 5 g's or greater. To determine if the accelerometer 80 is in a saturated state, the saturation detector 92 compares the absolute value of the acceleration value (voltage value) against an acceleration value slightly less that the maximum 5 g value such as a voltage value equivalent to ±4.8 g. When the acceleration signal is saturated, it is considered to be in a "railed" condition.

In accordance with the present invention, the saturation of the accelerometer 80 (a low g sensor) is used to control which safing accelerometer provides the safing function. The saturation detector function 92 provides a logic output signal (e.g., TRUE or FALSE) indicating whether the railed condition exists. The saturation detector function 92 provides a TRUE output signal in response to the determined railed condition. The saturation detector 92 includes an internal latching device or flag. The output of the saturation detector 92 is initially set to an OFF or FALSE condition, i.e., the accelerometer 80 is not railed. Once a saturation condition is detected, the internal latch or flag, and in turn, the output of 92 is set to an ON or TRUE state and is held in that state for either a predetermined time period or until reset in another desired manner so as to provide a desired control. The saturation detector function 92 provides the signal to an inverter 93 which is, in turn, connected to the second input of the AND function 90. The output of the AND function 90 can only be TRUE when the output of the saturation detector 92 is FALSE, i.e., a railed condition has not been detected, and the lateral acceleration sensed by the accelerometer 80 is greater than the threshold value 88.

As mentioned, a saturation threshold ("SATURATION_5Y") used by the saturation detector 92 is a value slightly less than the maximum expected voltage value from the accelerometer 80 when subjected to an acceleration at its maximum sensor rating. Since 5 g is the maximum sensing rating, a threshold SATURATION_5Y value is set to a voltage value that would be commensurate with the expected output voltage when the accelerometer is subjected to an acceleration of, for example, 4.8 g's.

The AND function 90 provides a logic TRUE output signal when (i) the saturation detector function provides a FALSE logic output signal (e.g., a railed condition has not been detected) and (ii) the comparator function 86 provides a logic TRUE condition (e.g., the sensed acceleration exceeds the threshold 88). The AND function 90, in turn, provides a logic output signal to an input of an OR function 94. The OR function 94, in turn, provides a logic output to the timed latch function 78. The OR function 94 outputs a HIGH or TRUE when either of its inputs is HIGH or TRUE.

The system 10 further includes a second safing acceleration sensor, such as an accelerometer 96, oriented to sense lateral or sideways acceleration of the vehicle preferably along the same axis as that of accelerometer 80. In this exemplary embodiment, the accelerometer 96 senses vehicle acceleration in a direction parallel to the Y axis (transverse to the front-to-rear axis of the vehicle), which is the same preferable direction along which accelerometer 80 senses vehicle acceleration. The accelerometer 96, in accordance with the present invention, has a substantially higher acceleration sensing range than that of accelerometer 80. In this exemplary embodiment, the accelerometer 96 has a rating of ±50 g. The accelerometer 80 is referred to as a low g sensor and the accelerometer 96 is referred to as a high g sensor.

The accelerometer 96 outputs about 40 mV/g over its operating range. Accordingly, the accelerometer 96 is particular useful for sensing vehicle dynamics associated with fast developing rollover events, such as an impact-induced vehicle rollover event. Other relationships of sensor operating ranges of accelerometers 80 and 96 also could be used in accordance with the present invention.

The accelerometer 96 provides an acceleration signal indicative of sensed acceleration to an appropriate filter network 98 formed of high-pass and low-pass filters. The filter network 98 provides a filtered signal to an appropriate A/D converter 100. The A/D converter 100 provides a digitized indication of the vehicle acceleration to a digital HP filter 97 to eliminate the DC drift that could result from the A/D conversion. The output of the HP filter 97 is connected to a LP filter 99 which removes high frequencies that are not useful in determining a rollover event. The output signal 101 of the LP filter 99 is converted to the absolute value by the controller 26. This absolute value of the filtered accelerometer signal is provided to a first input of a comparator function 102. An acceleration threshold function 104 provides a reference acceleration threshold ("THRESHOLD_1Y") to a second input of the comparator function 102. The acceleration THRESHOLD_1Y is greater than the acceleration threshold THRESHOLD_5Y and substantially less than the maximum voltage value that is expected from the accelerometer 96 when the accelerometer is subjected to an acceleration of 50 g. For example, the threshold THRESHOLD_1Y is set to a is value commensurate with the voltage value one would expect from accelerometer 96 when it is subject to an acceleration equal to 5 g.

The comparator function 102 provides a logic output to an input of an AND function 106 indicating whether the sensed acceleration exceeds the threshold THRESHOLD_1Y from the threshold function 104. The output of the saturation detector function 92 is provided to another input of the AND function 106. The AND function 106, thus, provides a logic output signal indicating whether the accelerometer 80 is in a railed or saturated condition and the acceleration sensed by the accelerometer 96 exceeds the threshold THRESHOLD-1Y provided by the threshold function 104. In particular, the AND function 106 provides a TRUE logic output signal when (i) the accelerometer 80 is in a railed condition (i.e., the acceleration signal is saturated as would occur when the vehicle is subjected to a very large acceleration event) and (ii) the acceleration sensed by the second accelerometer 96 exceeds the threshold THRESHOLD_1Y. The logic output from the AND function 106 is provided to a second input of the OR function 94.

The OR function 94 provides a safing signal 95 to the time latch function 78. In particular, the safing signal 95 is TRUE (e.g., ON or HIGH) when either of two vehicle sideways acceleration events occur. First, the safing signal 95 is ON when the acceleration sensed by the accelerometer 80 exceeds the threshold THRESHOLD_5Y, and the accelerometer 80 does not indicate that it is in a railed condition. As previously mentioned, a railed condition exists when the digitized acceleration signal approximates the maximum rating value of the accelerometer 80. Second, the safing signal 95 is ON when the accelerometer 80 is determined to be in a railed condition and the acceleration sensed by the accelerometer 96 exceeds the threshold THRESHOLD_1Y.

The saturation detector acts as a switch to control if the HIGH or LOW g sensor is used for the safing function. If the accelerometer 80 is not saturated, the saturation detector 92 outputs a LOW which, in effect, enables AND function 90 and disables AND function 106. When the accelerometer 80 is saturated, the saturation detector 92 outputs a HIGH which, in effect, disables AND function 90 and enables AND function 106.

When the safing signal 95 is switched to an ON or TRUE condition, the latch function 78 latches the occurrence of a logic TRUE signal and applies a latched TRUE to a second input of the AND function 76. More particularly, the OR function 94 provides a digital logic output 95 to the latch function 78. The logic output 95 indicates the Boolean result of OR-ing the outputs from the AND functions 90 and 106. The latch function 78 is operative to latch a logic TRUE or ON output signal 95 and apply the latched TRUE signal to the AND function 76 for a predetermined time period, such as about one second. Other latching durations could be used depending on the vehicle platform and the desired control.

The AND function 76 provides a logic output (e.g., TRUE) indicating when the roll-rate exceeds the variable roll-rate threshold 46 and at least one of the sensed safing conditions has been satisfied. Because the latch function 78 is configured to latch TRUE signals for a predetermined time period and the latch function 74 latches HIGH until reset by the value of the roll-angle θ returns back within predetermined reset values, the occurrence of a vehicle rollover event may be determined even when the AND functions 90 or 106 do not provide TRUE condition output signals contemporaneously with the comparator function 48 providing a logic TRUE output. The output of the AND function 76 is provided to a first input of an OR function 77. The output of the OR function 77 is connected to a fire controller function 110 which controls actuation of one or more actuatable occupant protection devices 112. When the output of AND function 76 is TRUE, the OR function 77 outputs a TRUE and the fire controller actuates the occupant protection devices 112.

The output 101 of LP filter 99 is connected to an input of a comparator function 103. A lateral acceleration threshold 113 is connected to the other input of the comparator 103. If the filtered accelerometer signal at 101 is greater than the value of the lateral acceleration threshold 113, the comparator 103 outputs a HIGH or TRUE to a latch function 114. The latch function 114 outputs a HIGH when it receives the HIGH from comparator 103 and maintains the HIGH output until reset by the value of the roll-angle θ at 38 falling back between reset threshold values. The output of latch 114 is connected to one input of an AND function 115.

A switched threshold function 116 receives the roll-angle indexed value from the roll-angle indexing function 40 and outputs a threshold that varies as a function of the roll-angle index value. The switched threshold is functionally related to the determined roll-angle (i.e., the integral of the roll-rate). Rather than using an indexed value, those skilled in the art will appreciate that a functional equation could be used to determine a switched threshold as a function of the determined roll-angle θ at 38. The switched threshold 116 is generally a lower value relative to. the roll-rate threshold 42. The roll-angle threshold 42 is referred to herein as the normal threshold and the switched threshold 116 is referred to as the lower threshold.

The switchable threshold 116 outputs its threshold to one input of a comparator 117. The second input of comparator 117 receives the absolute value of the roll-rate signal dθ/dt at 32 from absolute value function 47 and compares the absolute value of the roll-rate against the switched threshold 116. If the absolute value of the roll-rate is equal to or greater than the threshold 116, the comparator outputs a HIGH or TRUE. If the absolute value of the roll-rate is less than the switchable threshold 116, the comparator outputs a LOW or FALSE. The output of comparator 117 is connected to a latch function 118. The latch function 118 latches and outputs a HIGH when comparator 117 provides a HIGH output and maintains a HIGH output until the value of the roll-angle at 38 falls back within reset limits. The output of the latch 118 is connected to the second input of AND function 115. The output of the AND function 115 is connected to a second input of the OR function 77. If the absolute value of the roll-angle is greater than the switched threshold 116, as latched in latch 118, when the accelerometer value 101 is greater than the lateral acceleration threshold 113, as latched by latch 114, the occupant protection device 112 will be actuated.

By way of example, the occupant protection device 112 could be an inflatable occupant protection device (e.g., an air bag or air curtain), a seat belt pretensioner device, an actuatable roll bar and/or other actuatable devices capable of helping protect an occupant during a vehicle rollover condition.

Both the comparator 48 and the comparator 117 are connected to the absolute value of the roll-rate. By doing this, only positive thresholds need be considered in the comparisons. If the value of the roll-rate at 32 is monitored without determining the absolute value, then the roll-rate thresholds 42 and 116 along with comparison functions must compare negative roll-rate values against negative thresholds for roll events in the negative direction.

Figure 2A:
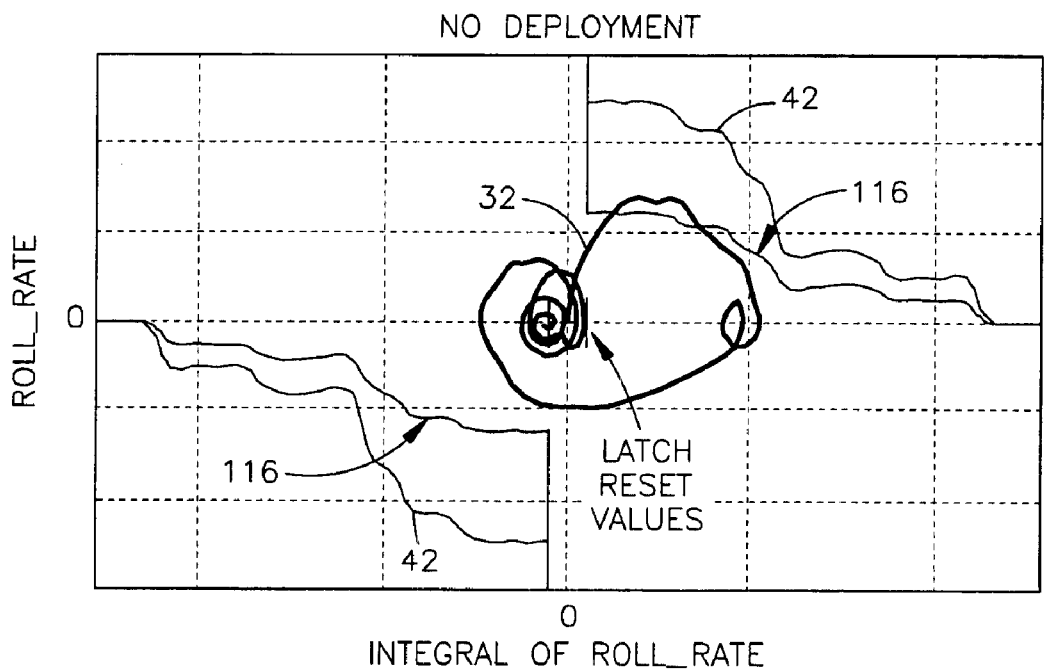
FIG. 2A is a plot of vehicle roll-rate vs. the integral of roll-rate for a non-deployment roll event.
Figure 2B:
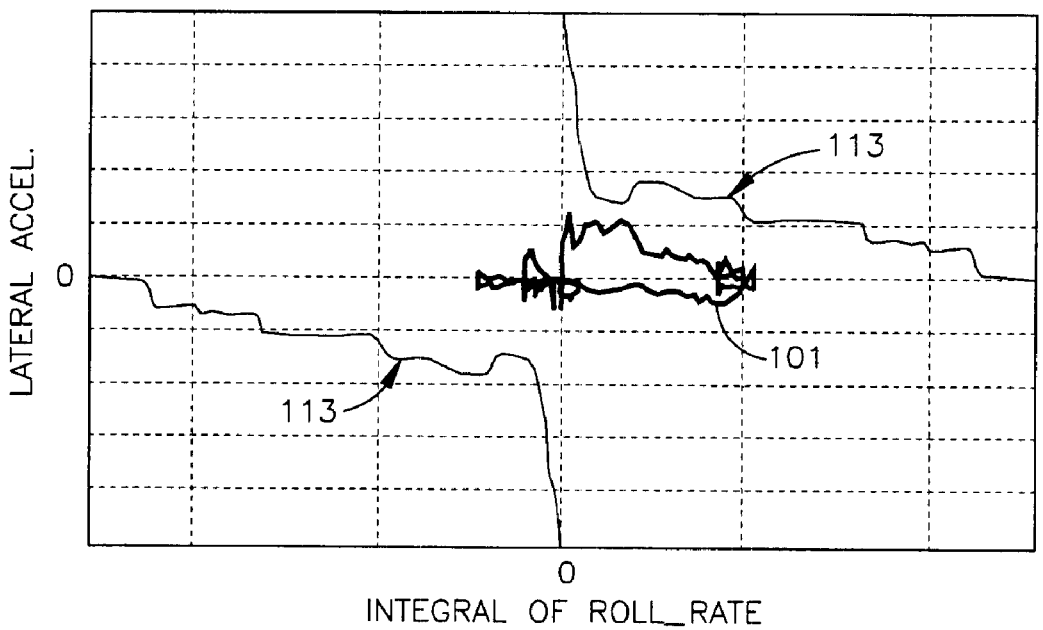
FIG. 2B is a plot of lateral acceleration vs. the integral of roll-rate for the roll event shown in FIG. 2A.

Referring to FIG. 2A, values of a roll-rate vs. the integral of roll-rate (i.e., determined roll-angle) for a particular maneuver of a vehicle platform is shown. This is a roll event that did not lead to a rollover event, i.e., the vehicle performed a maneuver that produced a signal from the rollover sensor but the event was a non-deployment event. In FIG. 2A, the normal threshold 42 and the switched threshold 116 are shown. Both are a function of the integral of the roll-rate. The roll-rate values in FIG. 2A cross the lower threshold 116 but not the higher or normal threshold 42. The plot of FIG. 2B is that of the filtered acceleration signal 101 vs. the integral of the roll-rate for this same vehicle maneuver depicted in FIG. 2A. These data points are compared against the lateral acceleration threshold 113 also shown in the FIG. 2B. Since the lateral acceleration values 101 never crosses the threshold 113, the comparator 103 continuously outputs a LOW or FALSE so that latch 114 does not switch to nor latch a HIGH output. Since latch 114 outputs a continuous LOW, the LOW is continuously applied to the AND function 115 which blocks the comparison result of the comparator function 117 and latch function 118. Therefore, the roll-rate value dθ/dt at 32 is only effectively compared against the normal or higher threshold value output from the threshold function 42. Since the roll-rate does not cross the higher threshold 42, comparator 48 continuously outputs a LOW and the restraint is not deployed since both inputs of the OR function 77 remain LOW.

Figure 3A:
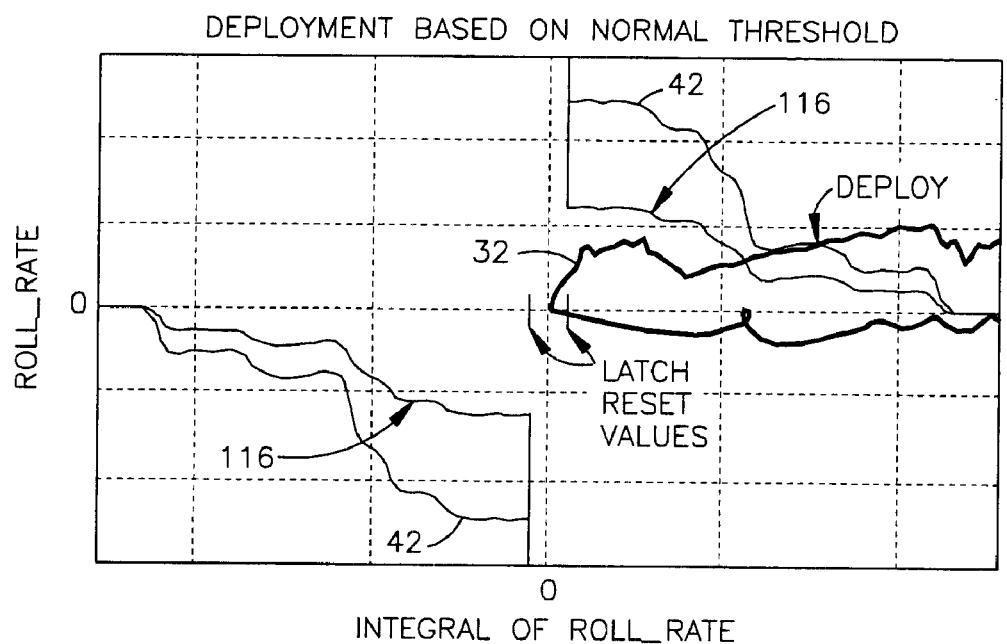
FIG. 3A is a plot of vehicle roll-rate vs. the integral of roll-rate for a deployment roll event.
Figure 3B:
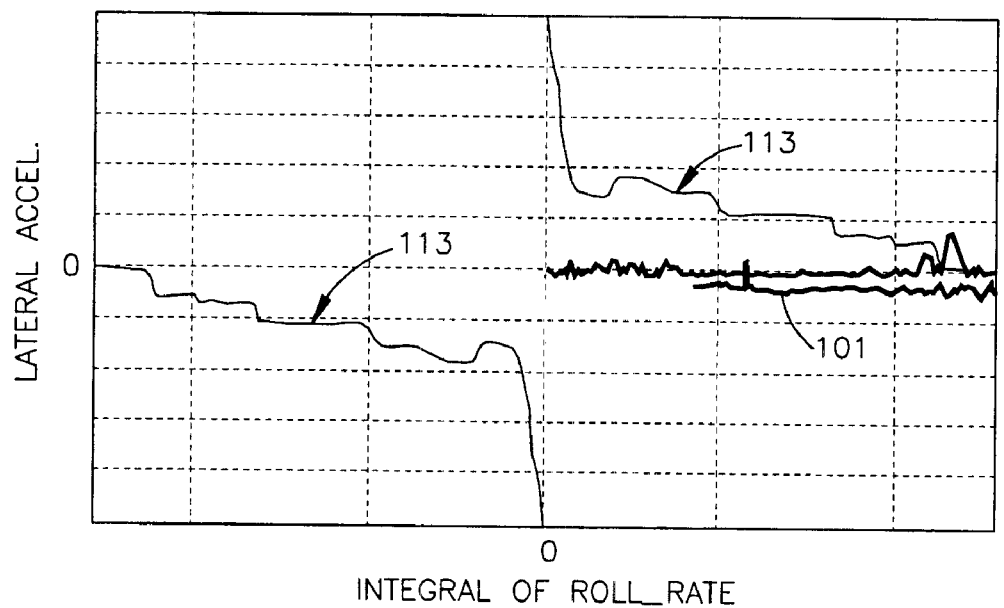
FIG. 3B is a plot of lateral acceleration vs. the integral of roll-rate for the roll event shown in FIG. 3A.

Referring to FIG. 3A, values of a roll-rate vs. the integral of roll-rate (i.e., determined roll-angle) for another particular maneuver of a vehicle is shown. This is a roll event that results in deployment of the occupant protection device 112. In FIG. 3A, the normal threshold 42 curve and switched threshold 116 curve are shown. As can be seen, the roll-rate data points cross, not only the lower threshold 116, but also the normal or higher threshold 42. The plot of FIG. 3B is that of the filtered acceleration signal 101 vs. the integral of the roll-rate for the same vehicle maneuver depicted in FIG. 3A. These data points, in FIG. 3B, are compared against the lateral acceleration threshold 113. Since the value of the filtered acceleration signal 101 never crosses the threshold 113, the comparator 103 continuously outputs a LOW or FALSE resulting in a continuous LOW to the AND function 115. The LOW to AND function 115 blocks the result of comparison 117. However, when the roll-rate crosses the roll-rate threshold 42, comparator 48 outputs a HIGH or TRUE which is latched by latch 74. The latch 74 switches its output HIGH in response to the HIGH from comparator function 48 and maintains the HIGH output until the value of the roll-rate falls back below a predetermined value shown as the latch reset value in the FIG. 3A. Assuming that the safing function, such as the safing function from the accelerometer 80, is TRUE so as to set latch 78 HIGH, the occupant protection device will be deployed.

The latches 74, 114, and 118 monitor the roll-angle value at 38. If they are set HIGH by a HIGH applied to their associated inputs, they remain HIGH until the roll-angle value exceeds the latch reset value shown in FIG. 2A and then drops back down below the reset value for positive roll-angle events. Negative roll events result in latch resets when the roll-angle falls below the negative reset value and then become greater than the negative reset value.

Figure 4A:
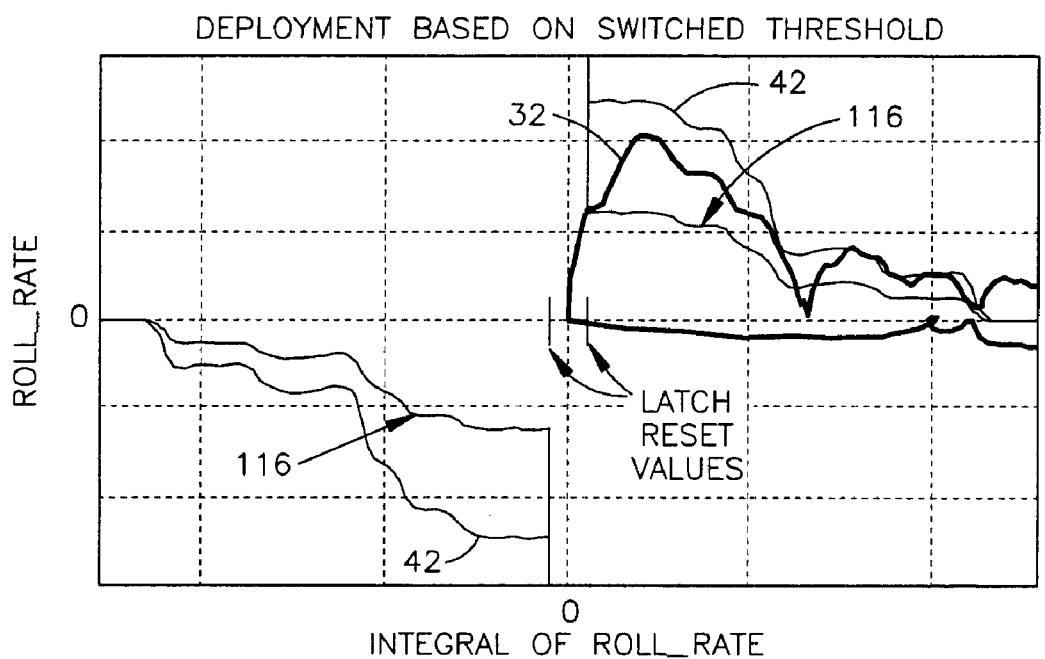
FIG. 4A is a plot of vehicle roll-rate vs. the integral of roll-rate for a deployment roll event.
Figure 4B:
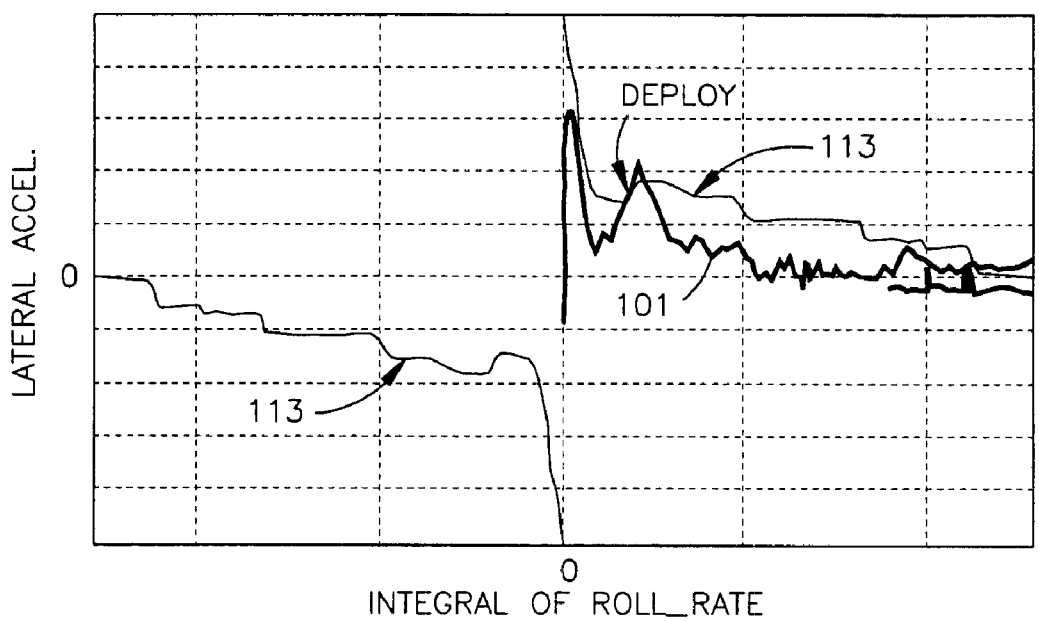
FIG. 4B is a plot of lateral acceleration vs. the integral of roll-rate for the roll event shown in FIG. 4A.

Referring to FIG. 4A, values of a roll-rate vs. the integral of roll-rate (i.e., determined roll-angle) for another particular maneuver of a vehicle is shown. This is a roll event that results in deployment of the occupant protection device 112. In FIG. 4A, the normal threshold 42 and switched threshold 116 are shown. As can be seen, the roll-rate data points cross the lower threshold 116. Crossing the lower threshold 116 switches the output of comparator 117 HIGH and latch 118 switches HIGH. This HIGH signal from latch 118 is, in effect, blocked at AND function 115 because comparator 103 and latch 114 both output a LOW initially. The plot of FIG. 4B is that of the filtered acceleration signal 101 vs. the integral of the roll-rate for the same steering maneuver. These data points, in FIG. 4B, are compared against the lateral acceleration threshold 113. At one stage of the roll event (marked with the word DEPLOY), the lateral acceleration signal 101 exceeds the lateral acceleration threshold 113. At that point, the latch 114 is switched HIGH. A HIGH is then applied to the AND function 115. Since both inputs of the AND function 115 are HIGH at this point, it outputs a HIGH to OR function 77 which results in actuation of the occupant protection device.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for detecting a vehicle rollover event comprising:
   a rollover sensor for sensing vehicle roll and providing a roll signal indicative of vehicle roll about a front-to-rear axis of the vehicle;

an accelerometer for sensing vehicle acceleration in a direction offset from the front-to-rear axis of the vehicle and providing an acceleration signal indicative thereof; and controller for comparing the roll signal from the rollover sensor against a first rollover threshold when the acceleration signal is less than an acceleration threshold and for comparing the roll signal from the rollover sensor against a second rollover threshold when the acceleration signal is equal to or greater than the acceleration threshold and for indicating a vehicle rollover condition when the roll signal from the rollover sensor is greater than the threshold it is compared against.

2. The apparatus of claim 1 wherein said rollover sensor senses roll-rate and provides a signal indicative of roll-rate of the vehicle.

3. The apparatus of claim 2 wherein said first rollover threshold is greater than said second rollover threshold.

4. The apparatus of claim 3 wherein said first rollover threshold and said second rollover threshold both vary as a function of an integral of roll-rate determined from said rollover sensor signal.

5. The apparatus of claim 1 wherein said controller includes means for varying the value of the acceleration threshold as a function of an integral of roll-rate determined from said roll signal.

6. The apparatus of claim 5 wherein said controller further includes means to latch the occurrence of the acceleration signal exceeding said acceleration threshold.

7. The apparatus of claim 6 wherein the controller resets the latch in response to the value of the integral of the roll-rate.

8. The apparatus of claim 1 wherein said controller includes means for performing a safing function in response to said acceleration signal and providing the indication of the vehicle rollover condition in further response to the safing function.

9. The apparatus of claim 1 further including an actuatable occupant protection device and means for actuating said occupant protection device in response to said indication of a rollover condition.

10. An occupant protection apparatus for detecting a vehicle rollover event and actuating an occupant protection device, said apparatus comprising:

a rollover sensor for sensing vehicle roll and providing a roll-rate signal indicative of vehicle roll-rate about a front-to-rear axis of the vehicle;

means for determining roll-angle from said roll-rate signal and for providing a signal indicative of roll-angle;

an accelerometer for sensing vehicle acceleration in a direction transverse to the front-to-rear axis of the vehicle and providing an acceleration signal indicative thereof; and controller for comparing the acceleration signal against an acceleration threshold and for comparing the roll-rate signal from the rollover sensor against a first rollover threshold when the acceleration signal is less than an acceleration threshold and for comparing the signal from the rollover sensor against a second rollover threshold when the acceleration signal is equal to or greater than the acceleration threshold and for actuating the occupant protection device when the signal from the rollover sensor is greater than the threshold it is compared against.

11. The apparatus of claim 10 wherein said controller includes means for determining roll-angle from the roll-rate signal and wherein said first and second rollover thresholds vary as a function roll-angle.

12. The apparatus of claim 11 wherein said controller further includes latching means for latching the occurrence of the acceleration signal exceeding the acceleration threshold.

13. The apparatus of claim 12 wherein said controller further includes means for resetting said latching means in response to the value of said roll-angle.

14. A method for detecting a vehicle rollover event comprising the steps of:

sensing vehicle roll about a front-to-rear axis of the vehicle and providing a roll signal indicative of vehicle roll;

sensing vehicle acceleration in a direction offset from the front-to-rear axis of the vehicle and providing an acceleration signal indicative thereof;

comparing the roll signal against a first rollover threshold when the acceleration signal is less than an acceleration threshold;

comparing the roll signal against a second rollover threshold when the acceleration signal is equal to or greater than the acceleration threshold; and indicating a vehicle rollover condition when the roll signal is greater than the threshold it is compared against.

15. A method for controlling an occupant protection apparatus in response to a vehicle rollover event, said method comprising the steps of:

sensing vehicle roll and providing a roll-rate signal indicative of vehicle roll-rate about a front-to-rear axis of the vehicle;

determining roll-angle from said roll-rate signal and for providing a signal indicative of roll-angle;

sensing vehicle acceleration in a direction transverse to the front-to-rear axis of the vehicle and providing an acceleration signal indicative thereof;

comparing the acceleration signal against an acceleration threshold;

comparing the roll-rate signal against a first rollover threshold when the acceleration signal is less than the acceleration threshold;

comparing the roll-rate signal against a second rollover threshold when the acceleration signal is equal to or greater than the acceleration threshold; and actuating the occupant protection device when the roll-rate signal is greater than the threshold it is compared against.

* * * * *